Aug. 15, 1933.  L. E. HEINRICH  1,922,806
ELECTRIC MOTOR
Filed Sept. 21, 1931   2 Sheets-Sheet 1

Inventor
Louis E. Heinrich
By
Hardway Cather
Attorneys

Aug. 15, 1933. L. E. HEINRICH 1,922,806
ELECTRIC MOTOR
Filed Sept. 21, 1931  2 Sheets-Sheet 2

Inventor
Louis E. Heinrich
By
Hardway Cathey
Attorneys

Patented Aug. 15, 1933

1,922,806

UNITED STATES PATENT OFFICE 1,922,806

ELECTRIC MOTOR

Louis E. Heinrich, Beaumont, Tex.

Application September 21, 1931
Serial No. 564,076

4 Claims. (Cl. 172—274)

This invention relates to an electric motor.

An object of the invention is to provide an electric motor of the character described of such construction that it will readily start under full load.

Another object of the invention is to provide a motor of the character described which is equipped with a novel type of switch and a centrifugal switch-actuating device whereby a full voltage may be applied, by the switch, to the stator of the motor with the coils in parallel, upon starting; and upon the attaining of sufficient speed to actuate the centrifugal switch-actuating device the coils will be cut into the circuit in series, thus obtaining full torque immediately upon the starting of the motor.

Another object of the invention is to provide a motor of the character described wherein the wound armature, the commutator, the short-circuiting device and the brushes, common to the conventional type of electric motor, are eliminated.

With the above and other objects in view, this invention has particular relation to certain novel features of construction, operation and arrangement of parts an example of which is given in this specification and illustrated in the accompanying drawings, wherein:—

Figure 1:
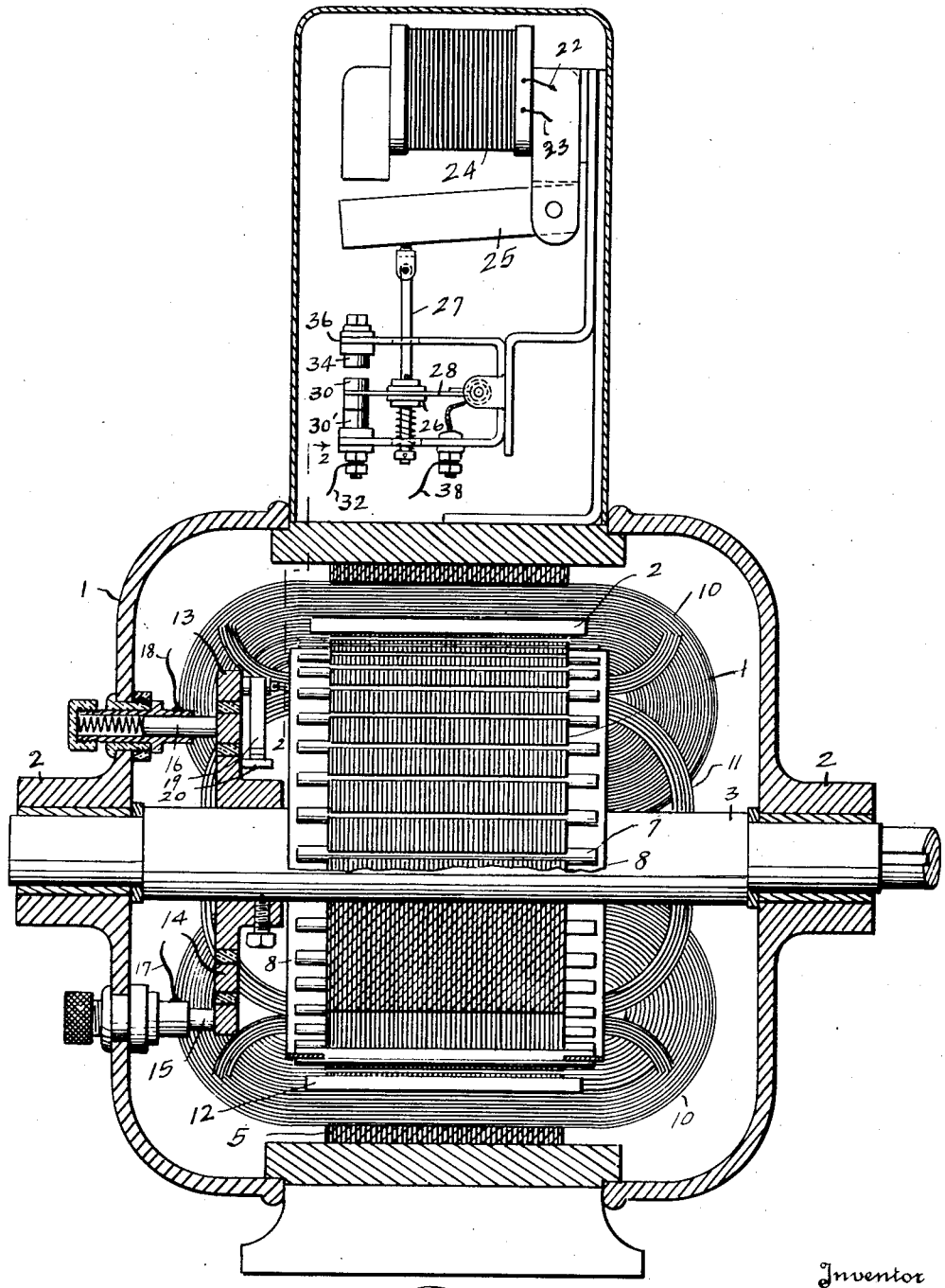
Figure 1 shows a sectional view of the motor and controlling switch.
Figures 2, 3:
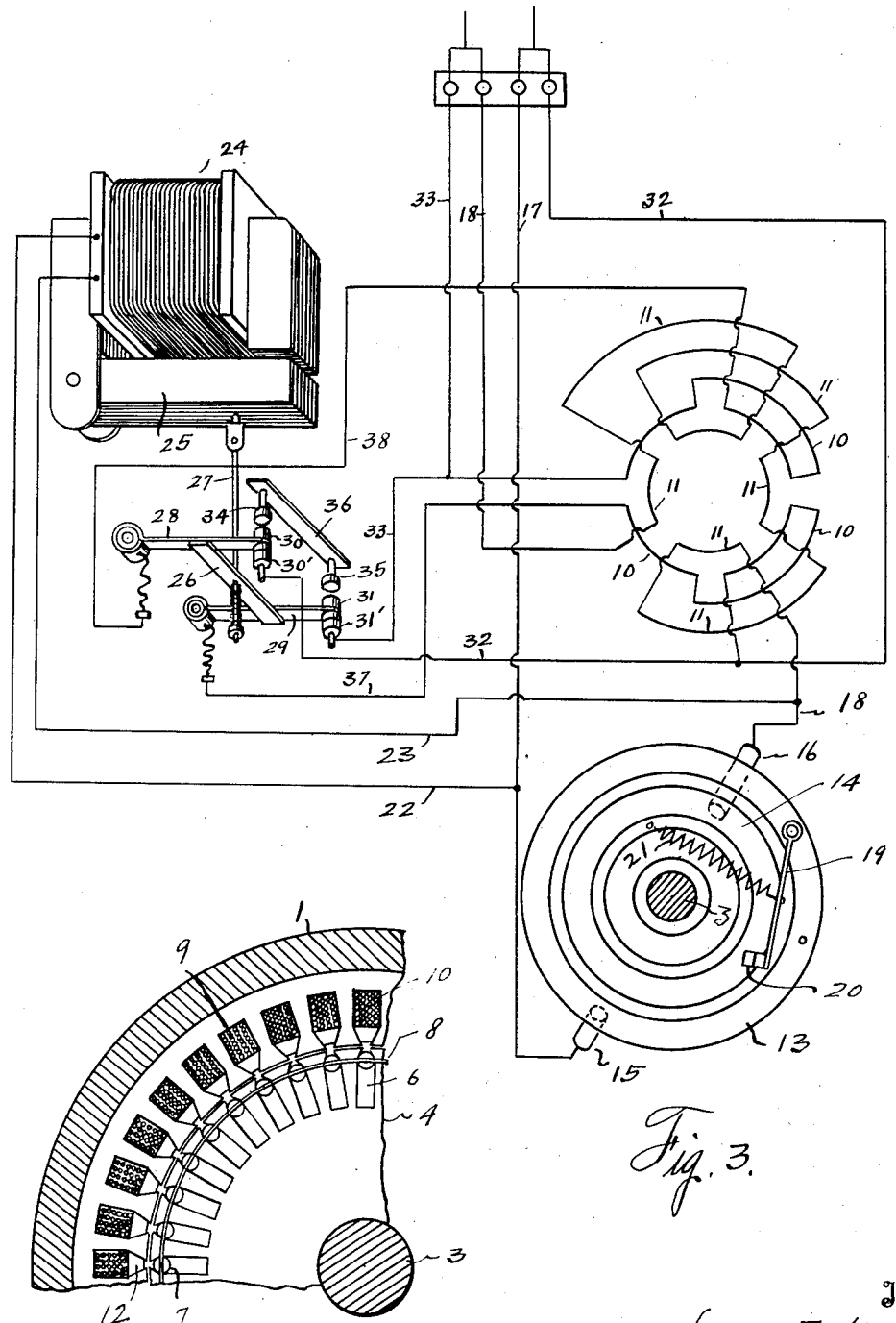
Figure 2 shows a fragmentary sectional view taken on the line 2—2 of Figure 1.
Figure 3 shows a diagrammatic view showing the wiring diagram, the controlling switch and the switch actuating device.

In the drawings the numeral 1 designates an enclosed housing having the end bearings 2, 2 in which the motor shaft 3 is mounted.

Fixed on the shaft 3 there is a rotor 4, which will be more specifically described hereinafter, and around the rotor 4 there is a stator, designated generally by the numeral 5 and fixed in the housing. The rotor is laminated, as shown in Figure 1 and has the deep, peripheral, lengthwise grooves 6 which converge outwardly and in these grooves are the rods 7, preferably of copper, whose ends project outwardly and are slitted to receive the metal retaining bands 8, 8, as shown which are preferably soldered thereto.

The stator 5 is also laminated and has the inside, longitudinal, converging grooves 9 to receive the running coils 10 and starting coils 11 which are retained therein by the wedge-like, wooden strips 12.

Fixed on the rotor shaft 3 are the concentric rings 13, 14 which are suitably insulated and the yieldable contact brushes 15, 16 are in frictional contact with said respective rings. There are the lead wires 17, 18 the latter of which is formed into the starting coils 11, which are connected to the brush 16 and the former of which is connected to the contact brush 15. A centrifugal switch 19 is pivotally connected to the ring 13 and carries a weighted head 20 which is normally held in contact with the ring 14 by the pull spring 21. A completed circuit is thus formed from the lead wire 17 through brush 15, ring 13, the switch 19, ring 14 and brush 16 and on through the coil 11 and back through lead wire 18. When an electrical current flows through the circuit thus formed the rotor 4 will be started and when the rotor speeds up the switch 19 will be thrown outwardly out of contact with the ring 14 and the circuit through the brushes will be broken and the current will then flow through the starting windings, or coils 11 and through the wiring 22, 23, connected with the leads 17, 18 and through the electro-magnet 24 and said magnet will be energized and the armature 25 will be lifted. This armature 25 is yieldably connected to a bar 26, preferably formed of copper, by the supporting rod 27, and said bar supports the pivotally mounted blades 28, 29. The free ends of these blades carry the contacts 30, 31 normally in contact with the fixed contacts 30', 31' to which the respective lead wires 32, 33 are connected. Upon starting the running coils 10 are thus connected into these lead wires 32, 33 in parallel. When the armature 25 is lifted the blades 28, 29 will be lifted to carry the contacts 30, 31 out of contact with the contacts 30', 31' and into contact with the contacts 34, 35 carried by the jumper plate 36, preferably of copper, and a circuit is thus completed by said jumper plate and knives 28, 29 and the leads 37, 38 through the coils 10 to the leads 32, 33, thus connecting the coils in series, and reducing the energy consumption.

From the foregoing it is apparent that upon starting full voltage will be supplied to the stator with the coils in parallel so that a minimum time will be required in starting under full load and upon the speeding up of the rotor the stator coils will be automatically connected in series thus maintaining the rotor speed but reducing the energy consumption. The drawings and description disclose what is now considered to be a preferred form of the invention by way of illustration only while the broad principle of the invention will be defined by the appended claims.

What I claim is:

1. An electric motor comprising a rotor, a stator around the rotor, a two section main winding and a single section auxiliary winding carried by the stator, an electromagnet, electrical current conductors into which the auxiliary winding and the magnet are connected, electrical conductors into which the main winding is connected in parallel, a centrifugally operable switch associated with the rotor and responsive to the rotor speed and effective to complete an electrical circuit through the magnet whereby said switch is actuated and connections whereby said main winding is connected in series upon such actuation of said switch.

2. An electric motor comprising a stator having a two section main winding and a single section auxiliary winding, an electromagnet, electrical conductors into which the auxiliary winding and said magnet are connected, electrical conductors into which the sections of the main winding are connected in parallel, a centrifugally operable switch, a rotor associated with the stator, a device responsive to the speed of the rotor effective to complete an electrical circuit through, and to energize, said magnet, said switch being arranged to be operated by said magnet when the latter is energized, to connect the sections of the main winding in series.

3. An electric motor comprising a stator having a two-section main winding and an auxiliary winding, and electro-magnet, electrical conductors into which the auxiliary winding and the magnet are connected, electrical conductors into which the sections of the main winding are connected in parallel, a centrifugally operable switch, a rotor associated with the stator, a device responsive to the speed of the rotor effective upon the operation thereof, to cause the completion of an electrical circuit through said magnet to energize the same, said switch being arranged to be operated by said magnet when the latter is energized, to connect said sections of the main winding in series.

4. An electrical motor comprising a stator having a two section main winding and an auxiliary winding, an electro-magnet, electrical conductors, connected into the magnet and into which the auxiliary winding is connected, electrical conductors into which the sections of the main winding are connected in parallel, a centrifugally operable switch associated with the magnet, a rotor associated with the stator, a device responsive to rotor speed effective to cause the completion of an electrical circuit through said magnet and the connection of the auxiliary winding in series, said switch being arranged to be operated by the magnet, when the magnet is energized, to connect the sections of the main winding, in series.

LOUIS E. HEINRICH.